No. 716,903. Patented Dec. 30, 1902.
M. E. KNIGHT.
COMPOUND ROTARY ENGINE.
(Application filed Apr. 18, 1902.)

(No Model.) 8 Sheets—Sheet 1.

Fig. 1.

WITNESSES.
John M. Benjamin.
A. L. Robinson.

INVENTOR.
Margaret E. Knight

No. 716,903. Patented Dec. 30, 1902.
M. E. KNIGHT.
COMPOUND ROTARY ENGINE.
(Application filed Apr. 18, 1902.)
(No Model.) 8 Sheets—Sheet 3.

Fig. 3.

WITNESSES.
John M. Benjamin
A. L. Robinson

INVENTOR.
Margaret E. Knight

No. 716,903. Patented Dec. 30, 1902.
M. E. KNIGHT.
COMPOUND ROTARY ENGINE.
(Application filed Apr. 18, 1902.)
(No Model.) 8 Sheets—Sheet 4.

WITNESSES.
John M. Benjamin
A. L. Robinson

INVENTOR
Margaret E. Knight

THE NORRIS PETERS CO., PHOTO-LITHO, WASHINGTON, D. C.

No. 716,903. Patented Dec. 30, 1902.
M. E. KNIGHT.
COMPOUND ROTARY ENGINE.
(Application filed Apr. 18, 1902.)
(No Model.) 8 Sheets—Sheet 5.

WITNESSES.
John M. Benjamin.
A. L. Robinson.

INVENTOR.
Margaret E. Knight

THE NORRIS PETERS CO., PHOTO-LITHO., WASHINGTON, D. C.

No. 716,903. Patented Dec. 30, 1902.
M. E. KNIGHT.
COMPOUND ROTARY ENGINE.
(Application filed Apr. 18, 1902.)

(No Model.) 8 Sheets—Sheet 6.

WITNESSES.
John M. Benjamin.
A. L. Robinson.

INVENTOR.
Margaret E. Knight

UNITED STATES PATENT OFFICE.

MARGARET E. KNIGHT, OF SOUTH FRAMINGHAM, MASSACHUSETTS.

COMPOUND ROTARY ENGINE.

SPECIFICATION forming part of Letters Patent No. 716,903, dated December 30, 1902.

Application filed April 18, 1902. Serial No. 103,512. (No model.)

*To all whom it may concern:*

Be it known that I, MARGARET E. KNIGHT, a citizen of the United States of America, residing at South Framingham, in the county of Middlesex and Commonwealth of Massachusetts, have invented certain Improvements in Compound Rotary Engines, of which the following is a specification.

The invention relates to compound rotary engines; and it consists in the novel arrangement of the two cylinders and the construction of the valve which supplies steam thereto, also in the form of the interior of the cylinders. These peculiarities will be understood from the following description, with reference to the accompanying drawings, wherein—

Fig. 9 is the same section of the valve as in Fig. 5, but with the valve turned to a position which directs the steam from the high-pressure to the low-pressure cylinder.

Referring to the drawings by designating characters, A is the exterior encompassing case of the engine, which may be jacketed with a covering A', of asbestos compound or other non-conductor of heat.

B is an interior casing or frame for the engine-cylinder and valve, constructed so as to leave a space C between it and the exterior case A, which space is utilized as a conduit for exhaust-steam and at the same time serves as a steam-jacket for the engine.

Figure 1:
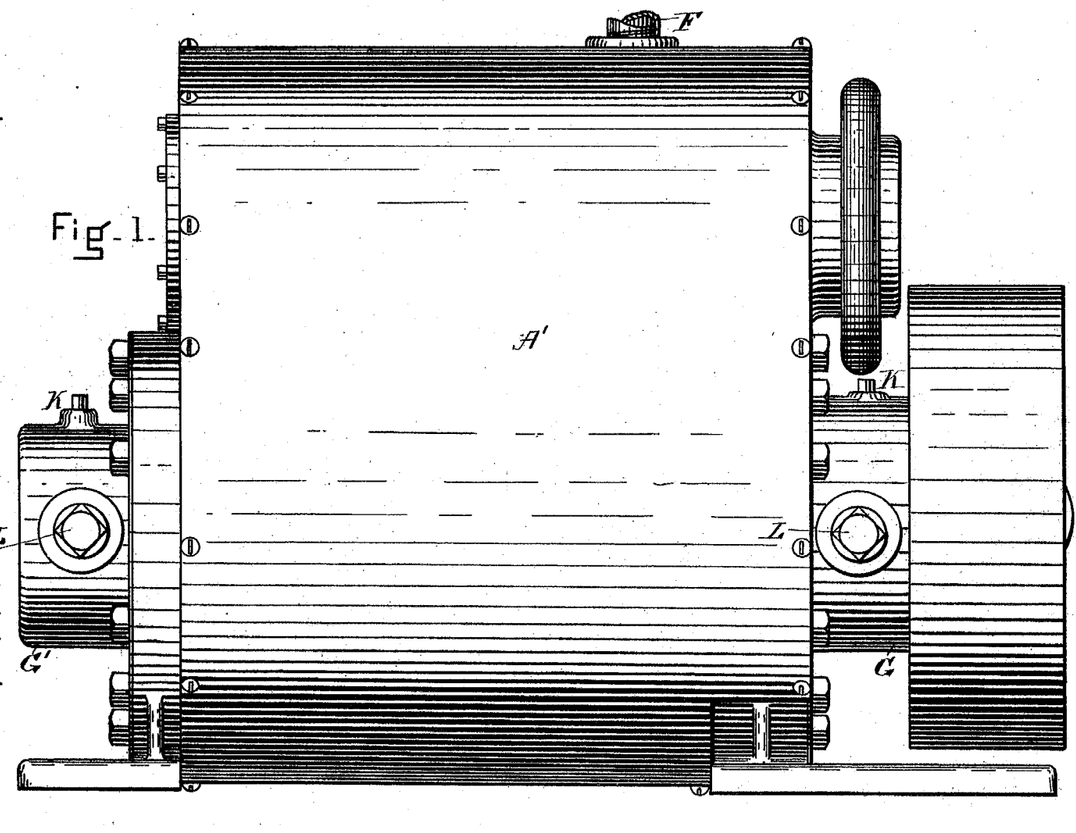
Figure 1 is a side elevation of the rotary engine with the outer casing complete.
Figure 3:
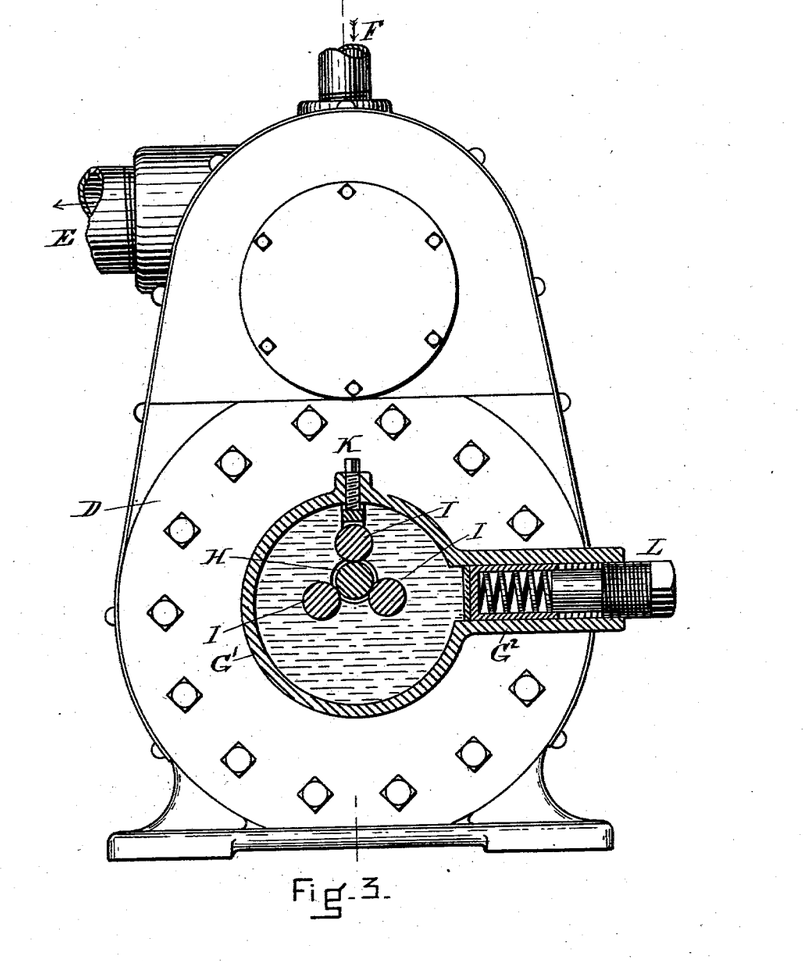
Fig. 3 is an end elevation with the shaft-bearing and its inclosing chamber in section on line 3 3, Fig. 2.

D in Fig. 3 is the head of the engine as viewed from the left of Fig. 1.

E is the exhaust-pipe, and F the steam-inlet.

Figure 14:
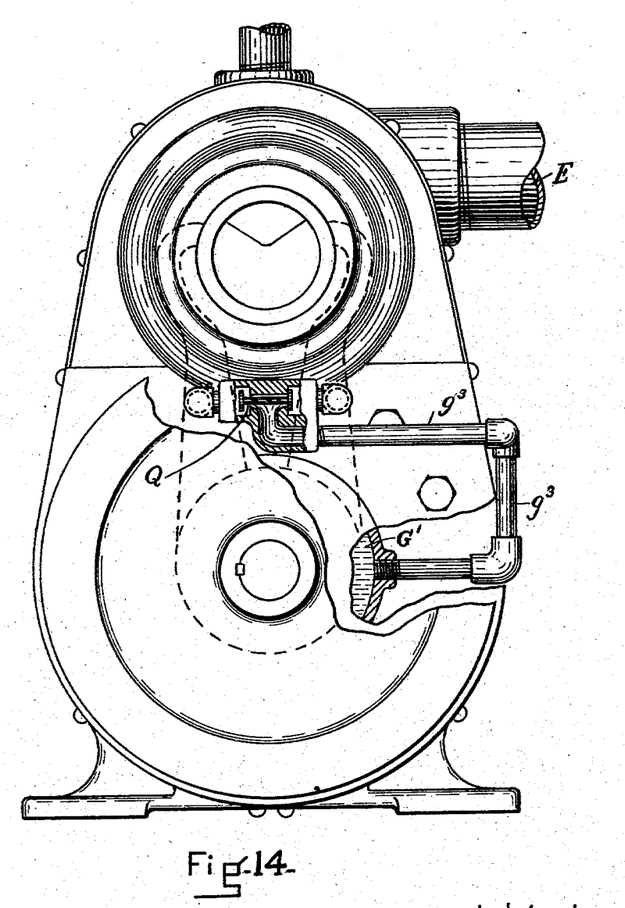
Fig. 14 is an elevation at the high-pressure-cylinder end of the engine, with a portion broken out entirely through the engine to show the connection of the pipe between the steam-passages of the high-pressure cylinder and the oil-chamber around the journal at the low-pressure end of the engine, also showing the valve at the connection of this pipe with the high-pressure cylinder, the steam-passages to which are indicated in dotted lines.

G G' are journal-box chambers which contain oil, in which the journals of the engine-shaft H are supported upon roller-bearings I, the upper one of which rollers may be provided with a pressure-adjusting screw K. (See Figs. 2 and 3.) The oil in the chambers G G' is also employed to lubricate the interior of the engine-cylinders, into which it is forced by plunger-screws L, which operate in sleeves $G^2$, attached to each chamber, or by means of steam-pressure conducted to the oil-chamber G' by a pipe $g^3$, leading from the high-pressure cylinder and to the chamber G by a pipe (not shown) leading from pipe F. Steam from the exhaust-passage of the high-pressure cylinder is employed to produce pressure in the oil-chamber G', as the pressure of steam in the low-pressure cylinder is usually a little less than in the high-pressure exhaust-passage, and for the purpose of always directing exhaust-steam from the high-pressure engine to the pipe $g^3$, Fig. 14, in whichever direction the engine is running connection is made with both steam-passages, and these connections lead to a valve Q, which may be designated a "double self-acting" check-valve. On whichever side the live steam enters it forces the valve to its seat on that side and opens the valve on the opposite side, which is then the exhaust side. The stem of the valve is smaller than the holes through which it slides and permits the exit of steam.

M is the high-pressure cylinder, and N the low-pressure cylinder, of my compound engine. Within the cylinder M is a hub $m'$, slotted diametrically to receive the reciprocating piston $m^2$, made in two symmetrical parts to facilitate its insertion into said hub and to permit separation at the edges within the hub to compensate for wear at the outer edges.

Within the cylinder N is a hub $n'$, slotted radially throughout its length and parallel with its axis. At the ends the slots are cut entirely through the hub and through the shaft H to receive the reciprocating piston $n^2$, provided with projecting portions at the ends thereof which extend down through such slots and meet upon the axial line of the cylinder at $a^2$, Fig. 2. In the abutment O above each cylinder is a gib or packing-piece $o'$, the upper and lower surfaces of which are made in curved form, as illustrated, to permit it to tilt to one side or the other, depending upon the direction in which the hub and piston are revolving and upon which side the greatest steam-pressure exists. A fly-wheel or belt-pulley Y is keyed to the end of shaft H.

Figures 2, 13:
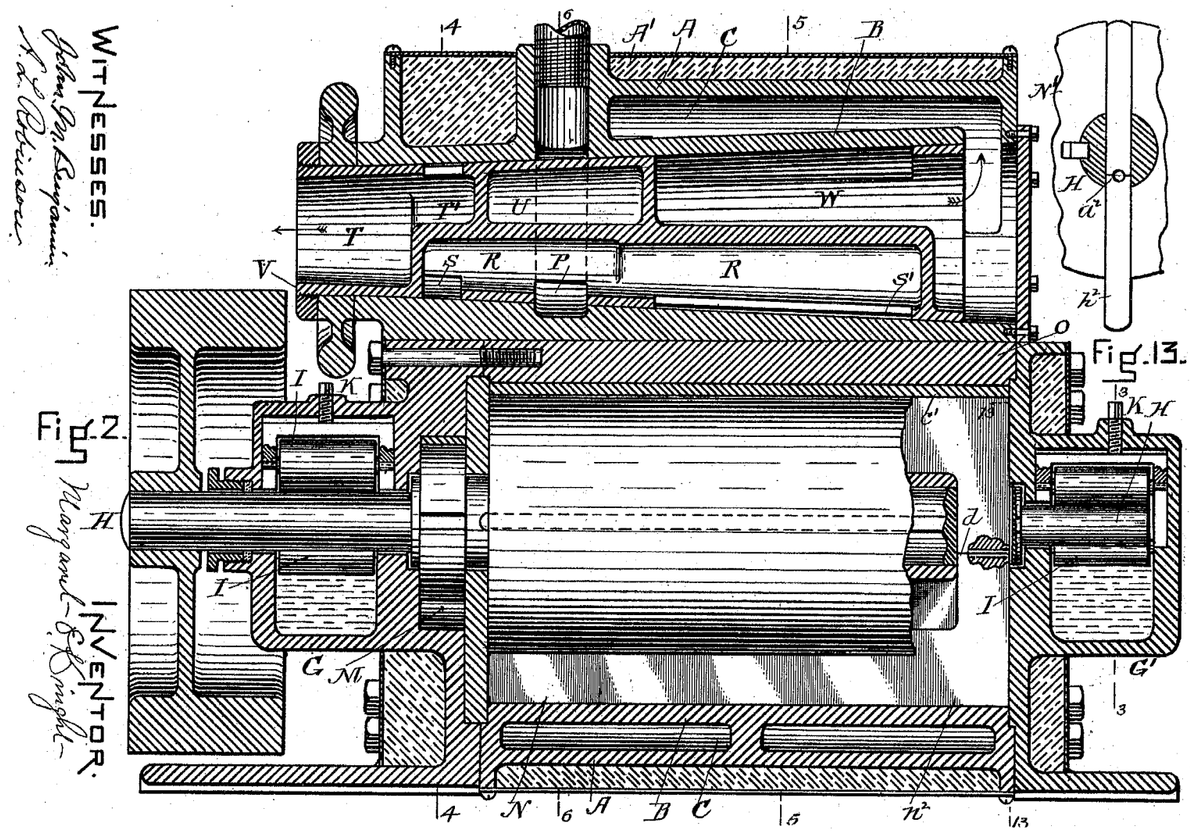
Fig. 2 is a central longitudinal vertical section of the rotary engine and the steam-valve.
Fig. 13 is a section through the piston and hub of the low-pressure cylinder on line 13 13, Fig. 2.
Figure 10:
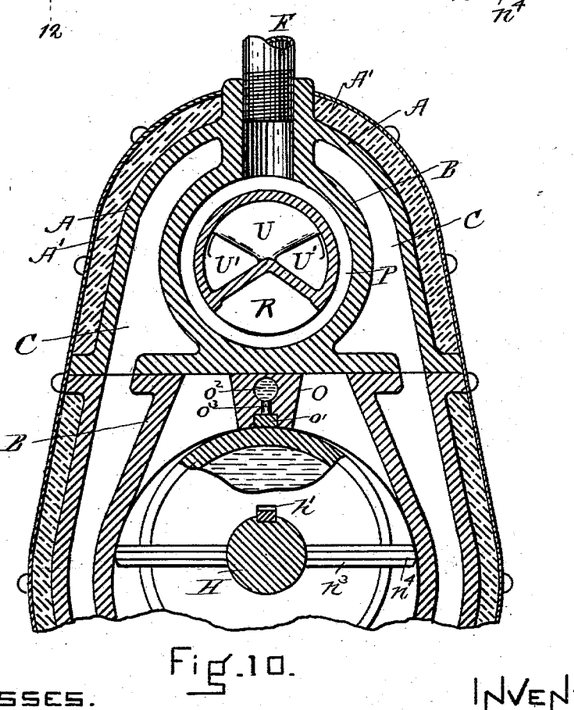
Fig. 10 is a sectional elevation through the low-pressure cylinder on line 6 6, Fig. 2, with the lower end broken away, also showing an end view of a modified form of piston.

The valve through which steam is supplied to these two cylinders is frusto-conical in form, although of slight taper, and as a whole is marked V. It is seated in a hole in the upper part of the frame of the engine, which is the counterpart of the exterior surface of the valve. The valve itself is divided by partitions into a number of different chambers. In the same perpendicular plane with the inlet-pipe F a passage P is made in the frame around the valve V, as shown in Figs. 2 and 10. Referring to this valve in the position which it occupies in Figs. 2, 4, 5, and 10, the chamber R in the lower part of the valve has a port which is coincident with the passage P, and therefore is always supplied with live steam. The said chamber R also has a port S, opening into a passage which leads to the cylinder M, and a port S', which in the first position of the valve in either direction opens into a passage leading to the cylinder N.

T is a chamber at one end of the valve, which leads to an outlet for steam to exhaust into the atmosphere, and it is provided with a contracted portion T' in its upper part, which has a port in the same vertical plane as the port which supplies live steam to the cylinder M.

Figure 4:
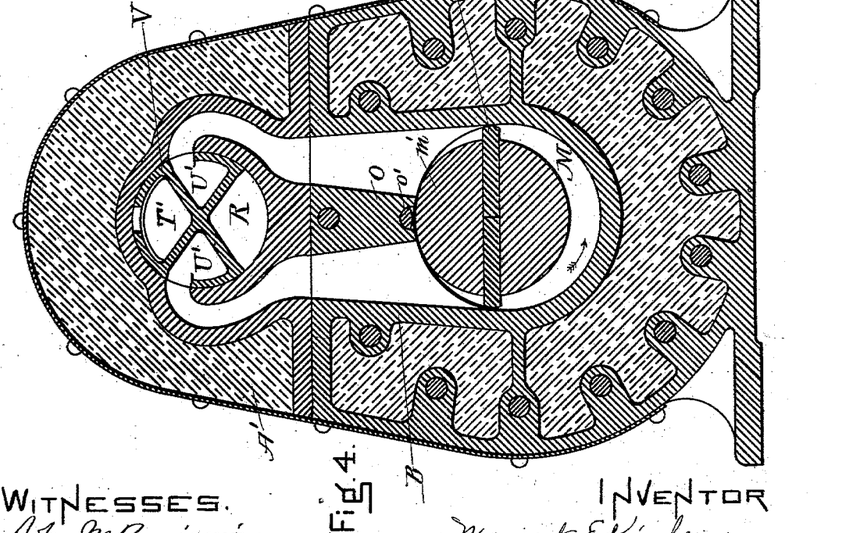
Fig. 4 is a sectional elevation of the engine through the high-pressure cylinder on line 4 4, Fig. 2, with the steam-valve closed.
Figure 5:
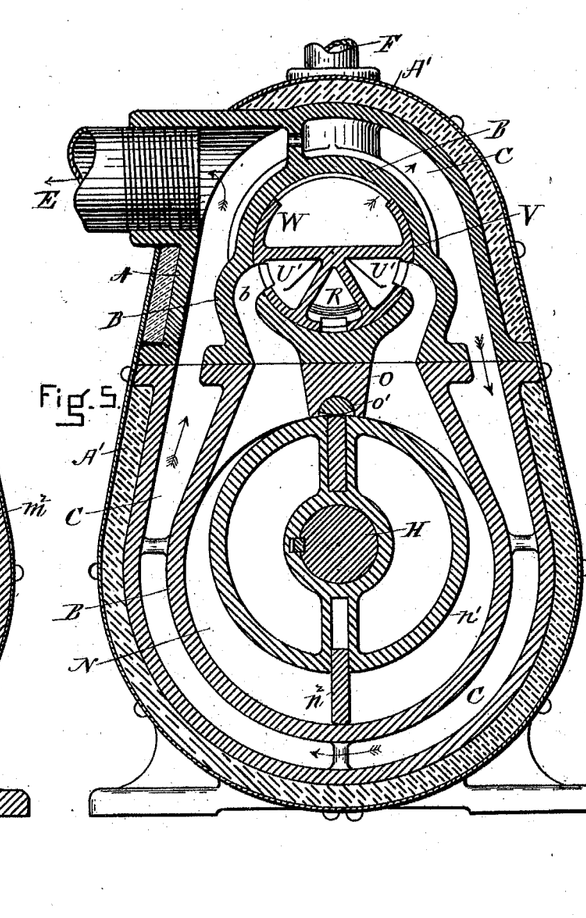
Fig. 5 is a sectional elevation through the low-pressure cylinder on line 5 5, Fig. 2, with the valve in the same position as in Fig. 4.
Figure 6:
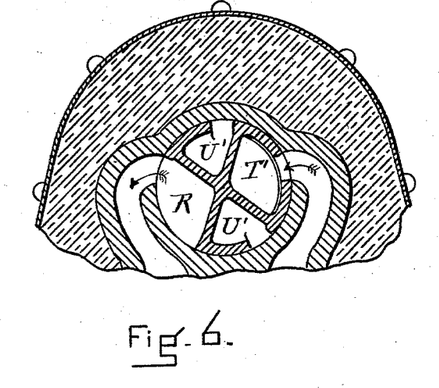
Fig. 6 is a view of the steam-valve upon the same section as in Fig. 4, but turned to a position to supply live steam to both cylinders and start the engine.
Figure 7:
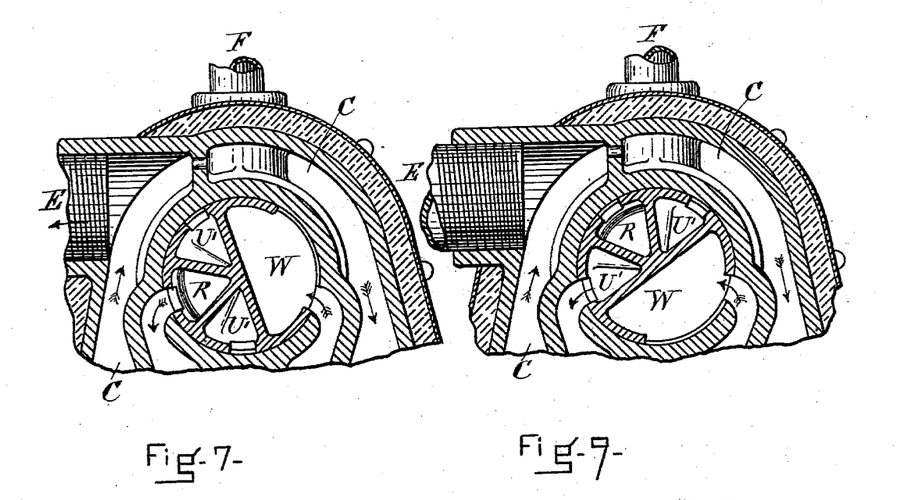
Fig. 7 is a view of the steam-valve upon the same section as in Fig. 5 and in the same position as in Fig. 6.
Figure 8:
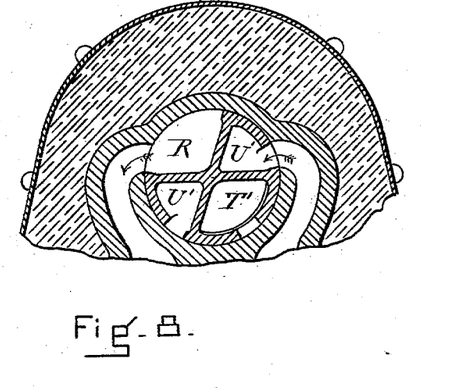
Fig. 8 is the same section of the valve as in Fig. 4, with the valve turned to a position to supply direct or live steam to the high-pressure cylinder only.

U is a chamber in the upper part of the valve, provided with lower wings U', which extend below and upon either side of the portion T' of the exhaust-chamber, as seen in Figs. 4, 6, and 8, and in the other direction beneath an exhaust-chamber W and upon either side of the chamber R, as may be seen in Figs. 5, 7, and 9. The relative positions of the chamber U and its wings U' are also illustrated in Fig. 10. Each of the wing-chambers U' is provided with a port which opens into one side or the other of the engine-cylinders, depending upon the position into which the valve is turned. The chamber W has a large port upon one side to insure a passage from the exhaust side of the cylinder N not only while the valve is in position to supply direct steam from the chamber R to the cylinder N, but also while in position to supply exhaust-steam from the cylinder M to the cylinder N through the ports in the wings U'. The chamber W is also open at one end and from there connects with the passage C, which surrounds the greater part of the engine and serves to form a steam-jacket therefor. This passage C opens into a pipe E, leading to a vacuum-chamber, so that when using the exhaust-steam from the cylinder M it may be employed even when its pressure in cylinder N is below that of the atmosphere.

Upon the end of the valve V is a hand-wheel $v'$, on the rim of which five notches or indicating-marks are made seventy-two degrees apart, and at a convenient place upon the frame an index-mark is made to enable the engineer to turn the valve to any desired position. For instance, to start the engine with direct steam to both cylinders turn the wheel $v'$ until the notch 1 is over the index-mark. Then to use the exhaust from cylinder M in cylinder N place notch 2 over the index-mark. To stop the engine, turn the wheel back until the notch $o$ is over the index-mark, and then to reverse the motion of the engine turn the wheel $v'$ in a direction opposite to the first movement—that is, to notch 4 to start the engine with direct steam and to notch 3 to exhaust from cylinder M to cylinder N. The notches upon the wheel $v'$ and the index-mark on the frame are not shown; but their positions will be readily understood. The simplicity both in construction and operation of this single valve gives it great advantage over the more complicated forms heretofore in use.

Figure 11:
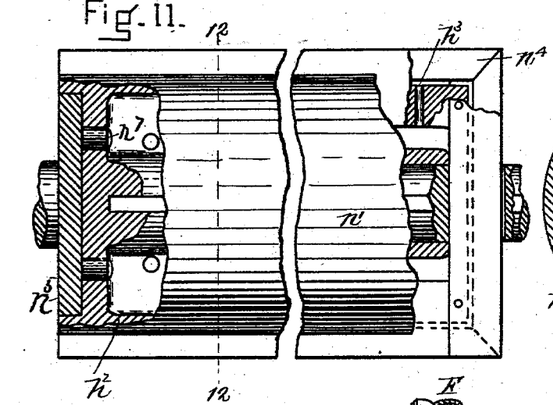
Fig. 11 is an elevation of a modified form of the hub and piston of the low-pressure cylinder, with portions at the ends broken away to show more clearly these modifications of construction.
Figure 12:
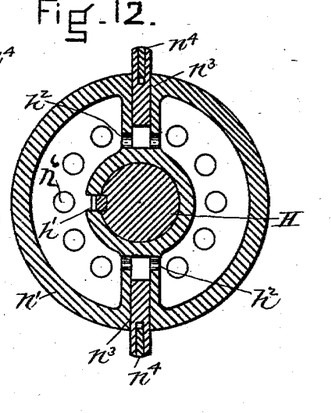
Fig. 12 is a section through said modified hub and piston on line 12 12, Fig. 11.

In Figs. 11 and 12, where a modified form of hub and piston is shown, $n^3$ is the piston, having gibs or bearing-plates $n^4$ inserted in grooves in the four edges thereof. In this construction the hollow hub $n'$ is supplied with steam or oil, which is admitted through a passage $h'$, left at the end of the key which secures the hub to the shaft H. Also the same fluid is conducted into the grooves under the inner edges of the plates $n^4$ through holes $h^2$ in the spokes of the hub $n'$ and thence through small holes $h^3$ into said grooves. When steam is employed, it may be conducted by any convenient branch from the pipe F to the chamber G and from there by suitable passages to the interior of the hub $m'$ and to the chamber $G'$ from the exhaust side of the high-pressure cylinder by the pipe $g^3$. This steam-pressure will press the plates $n^4$ outward and hold them constantly in contact with the inner surface of the engine-cylinder, and when oil is employed the steam-pressure will force that into the cylinders and other parts, or, as heretofore stated, pressure on the oil may be maintained by means of the plunger L, Fig. 3. In order to prevent leakage of steam at the ends of the hub $n'$, I may provide disks $n^5$, seated in cylindrical counterbores in each end of the hub, and to regulate the degree of pressure with which these disks shall bear upon the heads of the cylinder a requisite number of holes $n^6$ are made in the head of the hub to present the proper amount of surface to the pressure of the fluid within the hub, and pins $n^7$, secured to the disks, fill these holes. (See Figs. 11 and 12.)

In Fig. 10 is also illustrated means for producing pressure upon the packing-piece $o'$, which consists of a hole $o^2$, made in the abutment O, parallel with the axis of the cylinder. This hole has an opening into a passage leading from the journal-box chamber $G'$ and from which steam or oil may be supplied. From the hole $o^2$ small openings $o^3$ extend down to the groove in which the plate $o'$ is held, so that the pressure of the fluid in the hole $o^2$ may be exerted upon the plate $o'$ to press it tightly against the periphery of the hubs $n'$ and $m'$.

Figure 15:
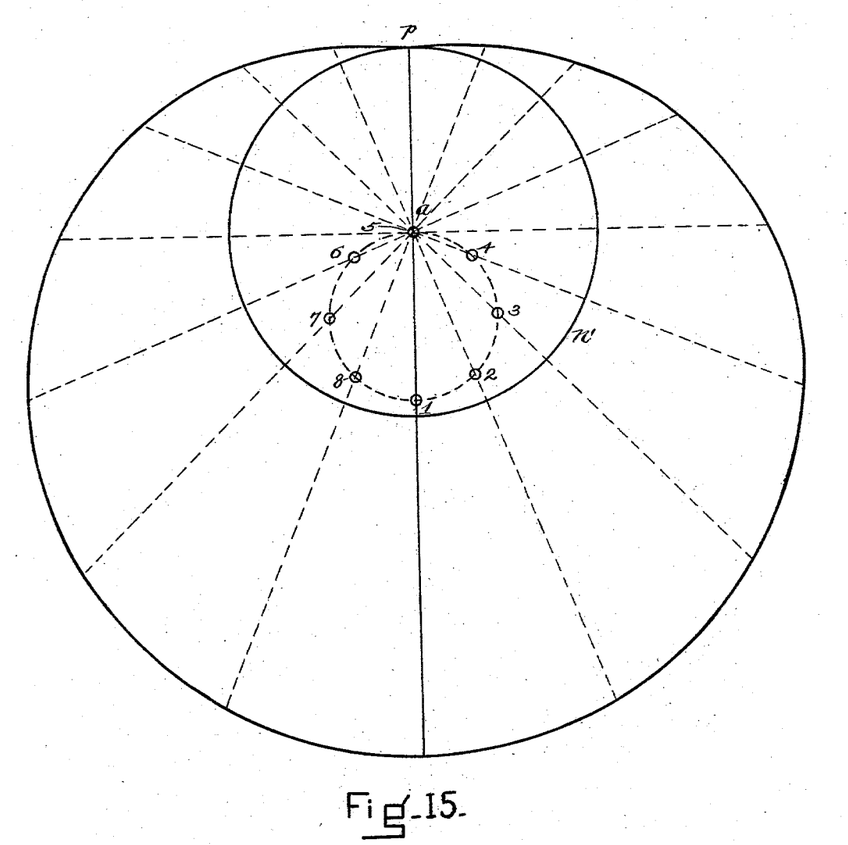
Fig. 15 is a diagram illustrating the internal contour of the cylinders and the manner in which its curved outline may be produced.

The interior form of the cylinders of my improved engine is of peculiar contour and, so far as I am aware, has never been employed in a rotary engine prior to my invention. This cylinder or piston chamber has what may be designated a "cylindroidal" surface, and its curve is one which is generated by the ends of a chord equal in length to that of the piston desired when the middle point of that chord is caused to move in a circle which passes through a point in the axis of rotation of the hub and when said chord at the same time constantly passes through said axial point. The diameter of this circle may vary according to the maximum amount of throw of the piston desired—that is, the maximum clearance or exposed surface of the piston between the periphery of the hub and the inner surface of the piston-chamber. As is illustrated in the diagram Fig. 15, the diameter of this circle around which the middle point of said chord is to be moved is equal to one-half the maximum throw of the piston. $p\,p$ may represent a chord which is the median line of the piston in what may be designated its "initial" position, with the maximum amount of surface exposed to steam-pressure between the periphery of the hub $n'$ and the inner surface of the cylinder N. $a$ is the axis of rotation of the hub. The chord $p\,p$ is represented in eight different positions, seven of which are in dotted lines, and the middle point of this chord is indicated by numbers 1 to 8 for the respective positions. In the position 5 the middle point is coincident with the axis $a$ of the hub, and by moving the middle point of the chord representing the piston about the small dotted-line circle, with this chord constantly passing through the axial point, $a$, as indicated, the ends of the chord will trace or generate the closed curve N, which indicates the contour of the interior of the cylinder in cross-section, and, as will be seen, a piston of the same length as this chord when constructed so as to slide diametrically through the hub will have its two ends constantly in contact with the surface of such a piston-chamber and without causing any uneven friction between the bearing-surfaces.

Various attempts have been heretofore made to accomplish this beneficial result in rotary engines of this character, but they have been only partially successful. As an instance, the manner of producing the interior surface of a cylinder described in Patent No. 348,879, September 7, 1886, where the curves of different portions of that surface are struck from different centers, thereby producing a series of intersecting arcs of circles, and, as is stated, producing an oval five-thirty-seconds of an inch greater in its horizontal diameter than in its vertical diameter, which of necessity would produce unequal pressure between the ends of the piston and the interior of the cylinder at some portions of the revolution of the piston, and at others only one end of the piston would be in contact with the interior of the cylinder, and the same conditions would exist if the piston-chamber was elliptical.

In a cylinder constructed in accordance with my method the curves of the interior are not arcs of circles, but the surface is coincident with a curve generated by constantly varying radii-vectors represented by the two portions of the chord $p\,p$ upon opposite sides of the hub-axis $a$, which is their pole or origin; but such surface is symmetrical upon the two sides of a vertical plane represented by the line $p\,p$, which passes through the axis of the hub, and the chord of every arc of the circumference of this closed curve when such chord passes through the axis of the hub is the same in length. This is not the fact with cylinders for rotary engines heretofore constructed, and although the contour of the interior of the cylinders shown in several patents heretofore granted appears to be substantially like my improved form they, in fact, only approximate to the perfected form, and thus fail to accomplish the much-desired practical results, and, as above demonstrated, are entirely different in construction.

In order to practically and commercially produce my improved form of piston-chamber, I have found it necessary to devise a cutting-tool which operates substantially in the manner hereinabove described as the operation or movement of the chord $p\,p$ when generating the curve delineated in the drawings.

The operation of the valve and engine is as follows: Live steam from the boiler enters through pipe F into the annular passage P and from thence into valve-chamber R, which always contains live steam in all positions of the valve V. In the position of valve shown in Figs. 2, 4, 5, and 10 the chamber R is closed and the engine is stationary. When viewing the engine as shown in Figs. 4 and 5, upon turning the valve one notch to the right it will assume the position shown in Figs. 6 and 7, and live steam from chamber R will be admitted to the left-hand passage leading to both high and low pressure cylinders, as indicated by arrows in these latter figures. The right-hand side of the high-pressure cylinder M is connected with a passage leading to the valve-chamber T', opening to the atmosphere through the valve-chamber T, and the right-hand side of the low-pressure cylinder N is connected with the exhaust-chamber C through valve-chamber W. Live steam is then acting on both cylinders, and the engine will turn to the left if viewed as illustrated in Figs. 4 to 9. On turning the valve another notch in the same direction live steam will be admitted to the left-hand side of the high-pressure cylinder M from valve-chamber R. The right-hand side of that cylinder will be connected to the left-hand side of the low-pressure cylinder N through valve-chamber U' U U', and the right-hand side of the cylinder N will be connected through valve-chamber W with the exhaust-passage C, which through pipe E leads to the vacuum-chamber. In this case live steam is admitted to the high-pressure cylinder M only, and the exhaust-steam from the high-pressure cylinder acts upon the piston in the low-pressure cylinder, and the engine will turn to the left, the valve being in the position shown in Figs. 8 and 9. The valve is symmetrical with respect to the two sides, so that turning the valve to the left has the same effect upon the engine as turning the valve to the right, except that it revolves in the reverse direction. The ratio of volume of steam passed by the high-pressure cylinder to the volume passed by the low-pressure depends upon the relative pressure in the boiler and the exhaust-chamber. The relative proportions in the sizes of cylinders, as shown, I have found satisfactory for an absolute pressure in the boiler of one hundred pounds and in the vacuum-chamber of two pounds when the engine is in operation. Both cylinders have steam acting on their pistons throughout the whole revolution and upon a surface area varying from that exposed when the piston is horizontal to that exposed when the piston is vertical.

I claim—

1. In a compound rotary engine the combination of two cylinders with their pistons upon the same shaft, and a valve constructed to supply live steam to both cylinders by a prescribed movement in either direction, and to continue live steam to one cylinder and to direct the exhaust-steam therefrom to the other cylinder by a further prescribed movement of said valve.

2. In a compound rotary engine, a single valve constructed to supply live steam to the high and low pressure cylinders and to open the exhaust-ports of each to the atmosphere, by a prescribed initial movement of the valve in either direction, and to continue live steam to the high-pressure cylinder and direct exhaust-steam therefrom to the low-pressure cylinder, and open the exhaust-port from the latter cylinder to a vacuum-chamber by a prescribed second movement of the valve.

3. In a rotary engine, the combination of a rotating hub eccentric to the piston-chamber, a piston of constant length extending diametrically through the hub, and adapted to reciprocate therein when the hub revolves, and a piston-chamber the peripheral surface of which is formed in curves which correspond to those generated by the ends of a chord of the same length as the piston, when this chord constantly passes through the axis of the hub, while its middle point is moved about a circle which also passes through said axis and whose diameter is equal to one-half the desired throw of the piston.

4. In a compound engine, the combination of an independent steam-passage between the two ports of the high-pressure cylinder, a valve in such passage which is automatically closed to the port containing live steam and opened to the exhaust-port, a lubricant-chamber external to the low-pressure cylinder with an opening between them and steam connections between said independent steam-passage and the lubricant-chamber, for the purpose described.

MARGARET E. KNIGHT.

Witnesses:
A. L. ROBINSON,
R. L. ROBERTS.